United States Patent
Thylen et al.

(10) Patent No.: US 10,261,262 B2
(45) Date of Patent: Apr. 16, 2019

(54) OPTICAL CIRCUITS AND OPTICAL SWITCHES

(71) Applicant: HEWLETT PACKARD ENTERPRISE DEVELOPMENT LP, Houston, TX (US)

(72) Inventors: Lars Helge Thylen, Huddinge (SE); Joaquin Matres Abril, Palo Alto, CA (US); Michael Renne Ty Tan, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 48 days.

(21) Appl. No.: 15/581,504

(22) Filed: Apr. 28, 2017

(65) Prior Publication Data
US 2018/0314010 A1    Nov. 1, 2018

(51) Int. Cl.
*G02B 6/35* (2006.01)
*G02B 6/124* (2006.01)
*G02B 6/126* (2006.01)
*G02B 6/293* (2006.01)
*H04Q 11/00* (2006.01)
*G02B 6/12* (2006.01)

(52) U.S. Cl.
CPC ........... *G02B 6/3594* (2013.01); *G02B 6/124* (2013.01); *G02B 6/126* (2013.01); *G02B 6/29338* (2013.01); *G02B 6/3596* (2013.01); *H04Q 11/0005* (2013.01); *G02B 2006/12147* (2013.01); *H04Q 2011/0022* (2013.01)

(58) Field of Classification Search
None
See application file for complete search history.

(56) References Cited

U.S. PATENT DOCUMENTS

| | | | |
|---|---|---|---|
| 6,363,183 B1* | 3/2002 | Koh | G02B 6/132 385/14 |
| 6,545,792 B2 | 4/2003 | He | |
| 7,505,648 B2 | 3/2009 | Klein et al. | |
| 2008/0145053 A1* | 6/2008 | Holmes | G02B 5/32 398/79 |
| 2012/0170933 A1 | 7/2012 | Doerr et al. | |
| 2012/0207428 A1 | 8/2012 | Roelkens et al. | |

OTHER PUBLICATIONS

Sant-Hun Kim, Compact 2×2 polarization-diversity Si-wire switch, Dec. 2014, 9 pages, https://www.osapublishing.org/DirectPDFAccess/D46E71FF-DCD9-15C3-441D86A05A05C3069A5_304841/oe-22-24-29818.pdf?da=1&id=304841&seq=0&mobile=no>.

* cited by examiner

*Primary Examiner* — Chad H Smith
(74) *Attorney, Agent, or Firm* — Hewlett Packard Enterprise Patent Department

(57) ABSTRACT

According to one example, the present application discloses an optical circuit comprising a grating to receive input light of mixed polarizations and output light of a same polarization to a first waveguide and a second waveguide. The first waveguide and second waveguide are optically coupled to a plurality of resonators that are coupled to a plurality of gratings that are to output light of mixed polarizations.

19 Claims, 7 Drawing Sheets

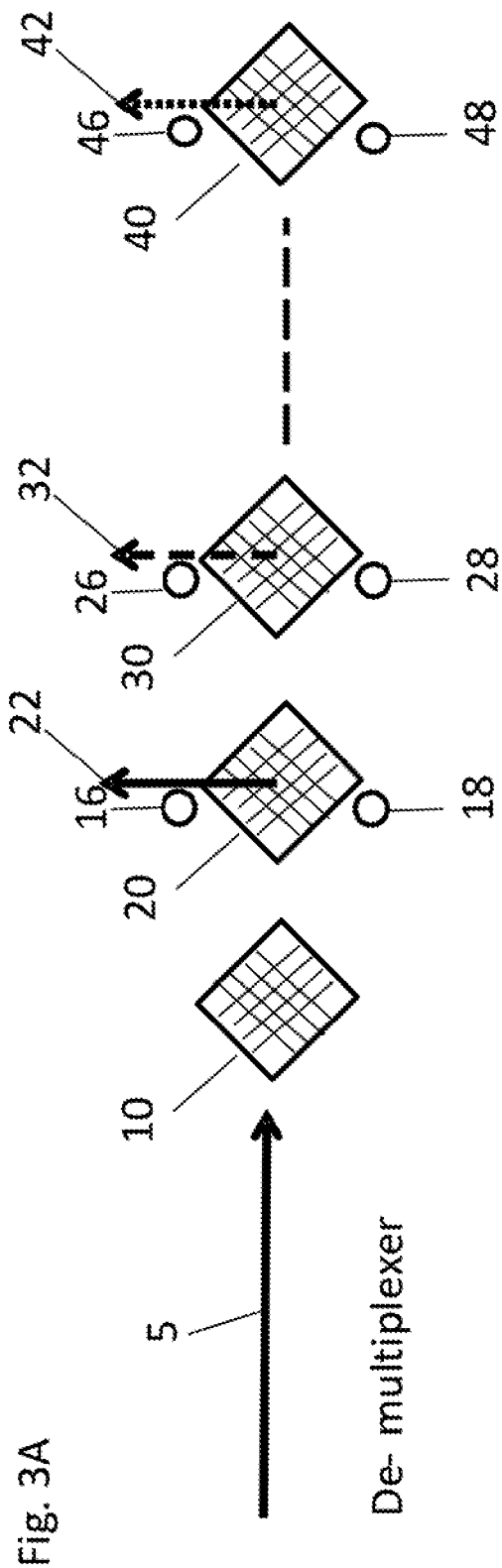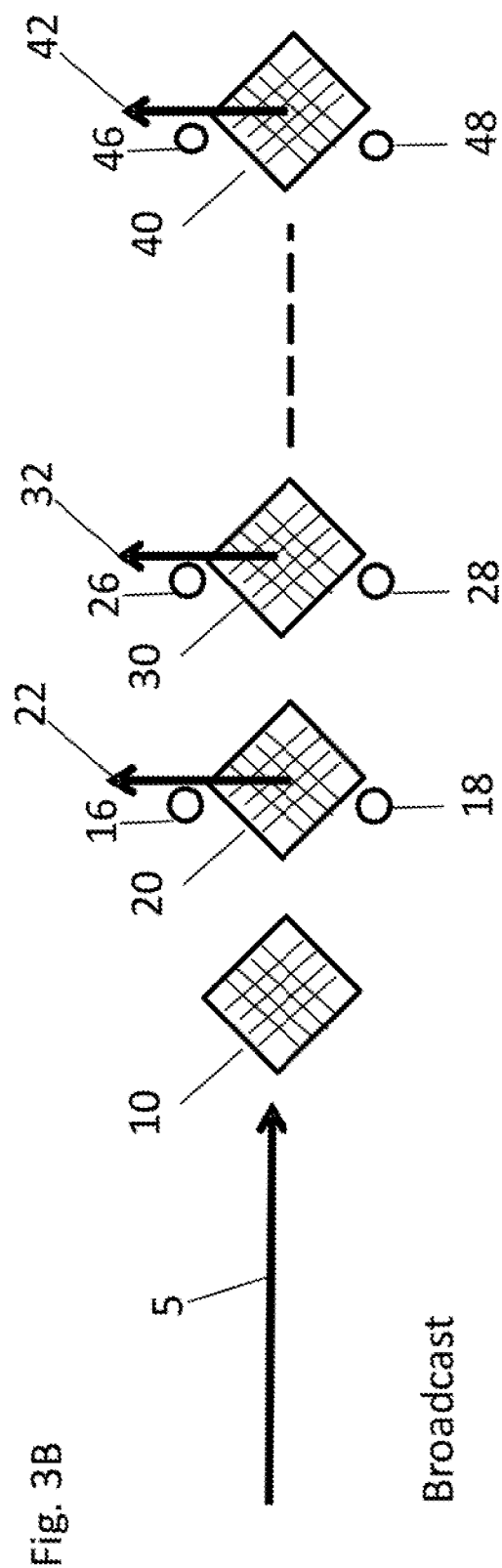

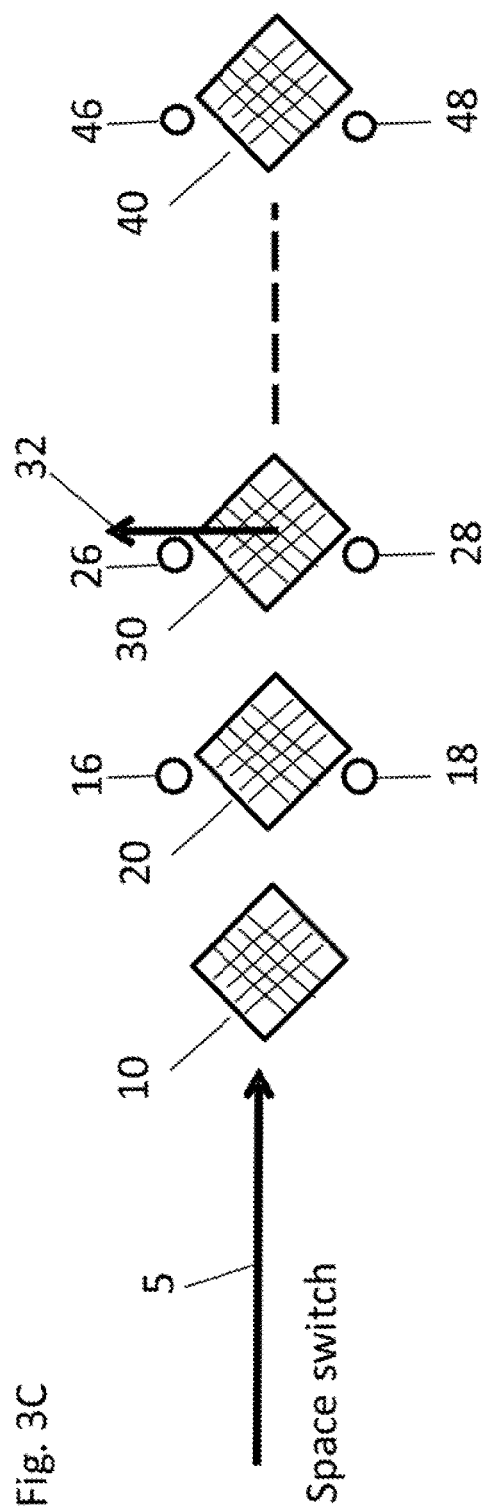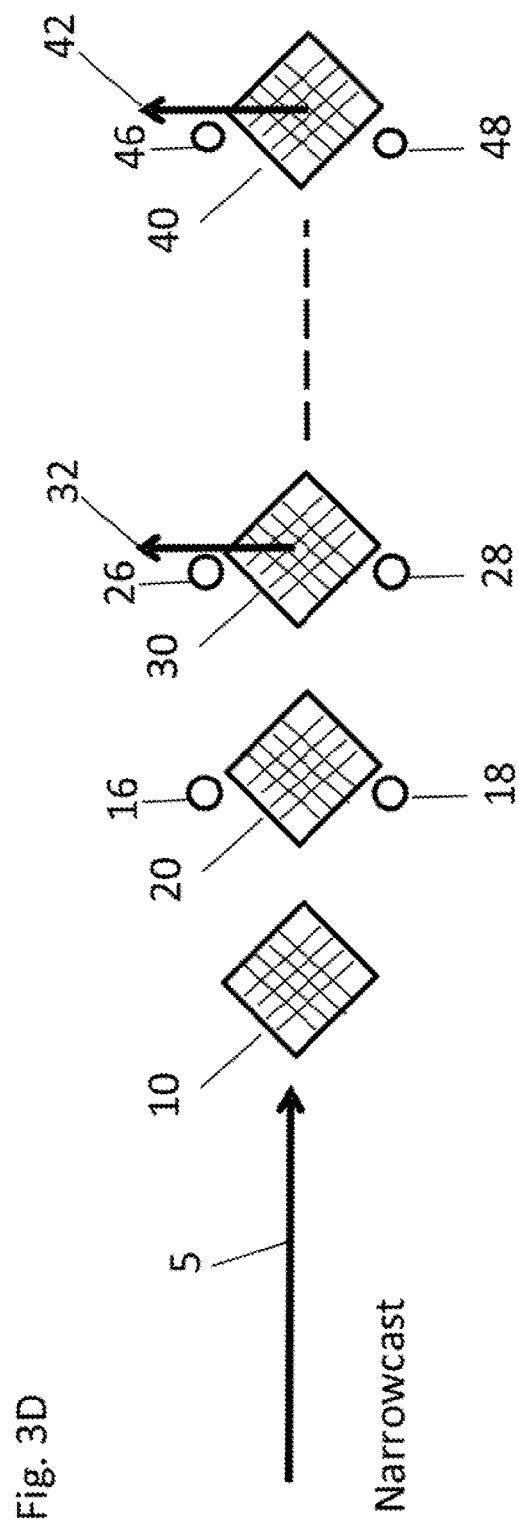

OPTICAL CIRCUITS AND OPTICAL SWITCHES

BACKGROUND

Light may be characterized as an electromagnetic wave which includes oscillating electric and magnetic fields which are at right angles to each other. Polarization states of light include Transverse Electric (TE) and Transverse Magnetic (TM). Optical switches switch light between at least one input and at least one of a plurality of outputs.

BRIEF DESCRIPTION OF THE DRAWINGS

Examples of the disclosure will now be described, by way of non-limiting example, with reference to the accompanying drawings, in which:

FIG. 3A is a schematic view of an example de-multiplexer according to the present disclosure;

FIG. 3B is a schematic view of an example broadcasting device according to the present disclosure;

FIG. 3C is a schematic view of an example space switch according to the present disclosure;

FIG. 3D is a schematic view of an example narrowcasting device according to the present disclosure;

DETAILED DESCRIPTION

For simplicity and illustrative purposes, the present disclosure is described by referring mainly to examples thereof. As used herein, the terms "includes" means includes but not limited to, the term "including" means including but not limited to. The term "comprises" means includes but not limited to, the term "comprising" means including but not limited to. The term "based on" means based at least in part on. The term "number" means any natural number equal to or greater than one. The terms "a" and "an" are intended to denote at least one of a particular element. In the context of this disclosure a first element and a second element being "optically coupled" means that light can pass from the first element into the second element or vice versa. In some cases the optical coupling may apply to light having certain wavelengths or characteristics.

Polarization states of light include Transverse Electric (TE) where there is no electric field in the direction of propagation of the wave and Transverse Magnetic (TM) where there is no magnetic field in the direction of propagation of the wave.

Optical fibers used in a data center often do not preserve polarization. Thus, for example, light entering an optical fiber with TE polarization may exit the optical fiber with a mixture or TE and TM polarizations. Many optical switching mechanisms are sensitive to differences in light polarization and may for example only work with a certain type of light polarization, or may act differently on different light polarizations. One way to address this is to use polarization preserving optical fibers, but these are not standard in a data center and can be expensive, cumbersome and difficult to couple. Another approach is to filter out polarizations which are not compatible with a switch, but this degrades the signal and may lose information associated with other polarizations.

The present application proposes optical circuits and optical switches which can handle mixed polarizations of light.

Figure 1:
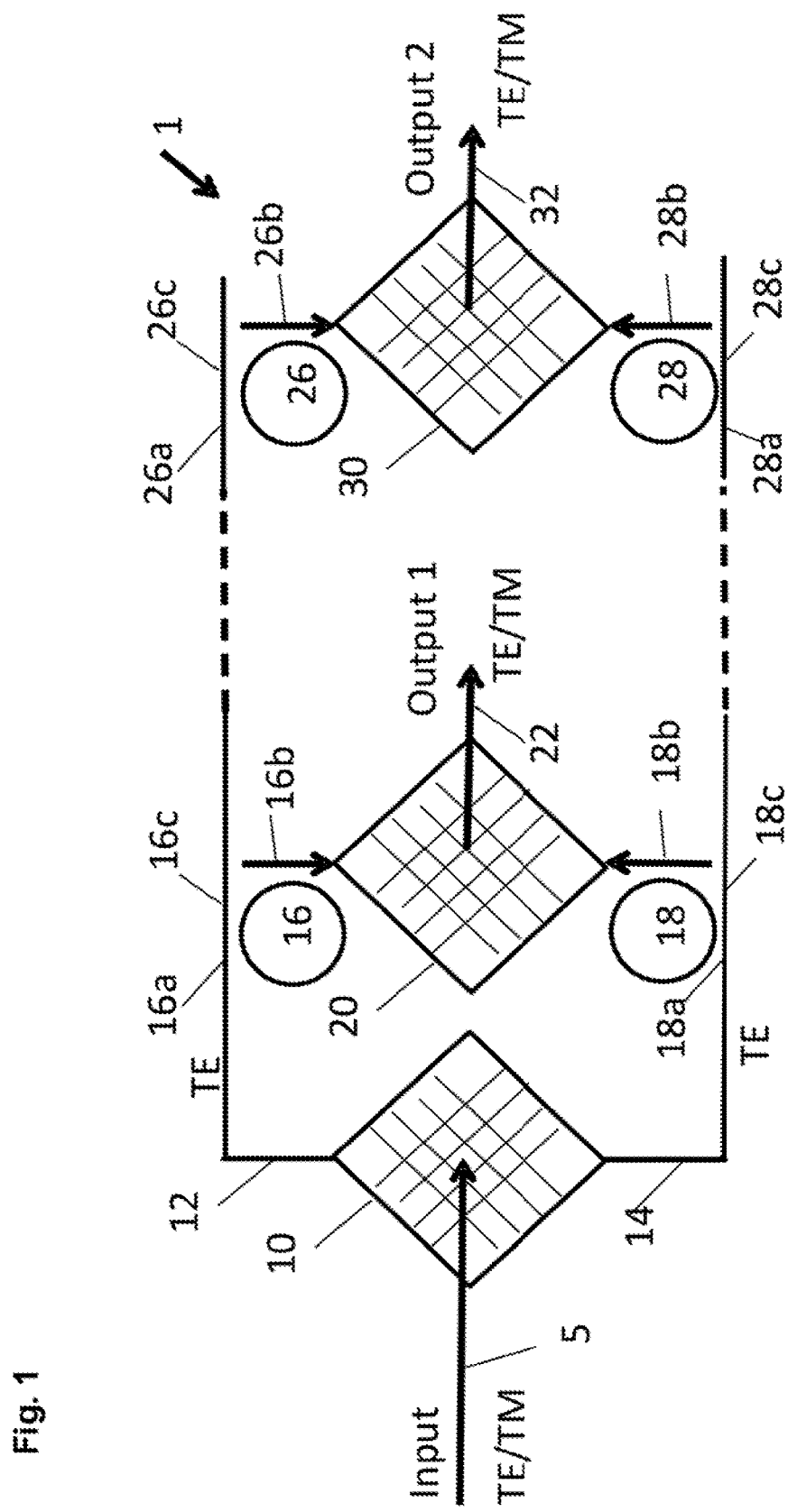
FIG. 1 is a schematic view of an example optical circuit according to the present disclosure.

FIG. 1 shows an example optical circuit 1 according to the present disclosure. The optical circuit 1 includes a plurality of optical devices, such as gratings, waveguides and resonators etc, which may be formed on the same photonics integrated chip. Forming the optical devices together on the same integrated chip may enable the optical circuit to be manufactured at a large scale, at low unit cost with high reliability. In one example, the optical circuit is formed on a silicon photonics integrated chip. Silicon photonics integrated chips may be manufactured using techniques and equipment from the electronic integrated chip industry to pattern the silicon chip to sub-micrometer precision and produce low cost, high quality photonic devices at scale.

The optical circuit 1 includes a first polarization diversity grating (PDG) 10 that acts as an input to the circuit and is to receive input light 5 of two mixed polarizations (e.g. TE/TM). The PDG 10 may, for example, receive mixed polarization light from a single mode optical fiber, a multi-mode optical fiber or from another type of single mode or multi-mode waveguide. For instance, an optical fiber may approach the PDG at an angle from above or below and abut the PDG or emit a beam of light through free space or a transparent material into the PDG.

A polarization diversity grating (PDG) is a grating which is able to receive light of two mixed polarizations (e.g. TE/TM) and split the light between a first waveguide and a second waveguide. The polarization diversity grating thus acts as a polarization splitter, but unlike a conventional polarization splitter, the light output to the first waveguide and the second waveguide have the same polarization.

For instance the PDG may couple light of the first polarization (e.g. TE) to the first waveguide. Further, the PDG may couple light of the second polarization (e.g. TM) to the second waveguide, but in a manner which transforms the coupled light to the first polarization (e.g. TE). Thus light coupled to the first waveguide 12 may have an amplitude and phase etc corresponding to the TE component of the input mixed polarization light 5, while light coupled to the second waveguide 14 although in TE form may have an amplitude and phase etc corresponding to the TM component of the input mixed polarization light 5.

The polarization diversity grating may for example be a 2D grating which includes a 2D pattern of reflective structures. For example, a 2D grating may comprise regularly spaced columns and rows of reflective structures.

The first waveguide 12 and the second waveguide 14 may be single mode waveguides. In one example, the first and second waveguides are silicon-based waveguides formed in a silicon on insulator structure.

The first waveguide 12 is optically coupled to a plurality of resonators including a first resonator 16 and a second resonator 26. In the context of this disclosure, a resonator is a device which has at least one resonant wavelength and is able to tap light at the resonant wavelength from a waveguide that is optically coupled to the resonator. In this context to tap light means to optically couple, from the waveguide to the resonator, some or all of the light of the resonant wavelength.

Examples of resonators include ring resonators. A ring resonator may be a waveguide formed in the shape of a ring, racetrack, ellipse or disk etc around which light may travel in a continuous loop which acts as an optical cavity. Ring resonators are thus sometimes referred to as loop waveguides. Certain wavelengths of light resonate in the loop waveguide and may be coupled to or from nearby waveguides, for instance by evanescent coupling. In this way, light of a resonant wavelength may be transferred from a first waveguide to another waveguide by the ring resonator, while light of a non-resonant wavelength may bypass the ring resonator and continue along the first waveguide.

A resonator thus comprises an optical cavity having at least one resonant wavelength, an 'in port', a 'drop port' and a 'through port'. The resonator (e.g. 16 in FIG. 1) is configured to receive light through the in port (e.g. 16a), direct light of a resonant wavelength through the drop port (e.g. 16b) and a direct light which is not of a resonant wavelength through the through port (e.g. 16c). While, the above refers to the numbering for first resonator 16 in FIG. 1, as an example, the numbering scheme for the other resonators is the same so that the second resonator 18 has an in port 18a, a drop port 18b and a through port 18c etc. Likewise, for resonators 26 and 28. The coupling to and from the resonator may be by evanescent coupling.

As shown in FIG. 1, the through port 16c of the first resonator 16 is optically coupled via the first waveguide 12 to the in port 26a of the third resonator 26. Likewise, the through port 18c of the second resonator 18 is optically coupled via the second waveguide 14 to the in port 28a of the fourth resonator 28.

The drop ports 16b and 18b of the first and second resonators 16, 18 are optically coupled to a second polarization diversity grating (PDG) 20, which is downstream of the first PDG 10. The drop ports 26b and 28b of the third and fourth resonators 26, 28 are optically coupled to a third polarization diversity grating (PDG) 30, which is downstream of the first and second PDGs. The first PDG 10 may thus be referred to as an upstream PDG, while the second PDG 20 and third PDG 30 may be referred to as downstream PDGs.

The second PDG 20 is coupled to the drop port 16b of the first resonator 16 and the drop port 18b of the second resonator 18. The second PDG thus receives light of the same (e.g. TE) polarization from the first resonator 16 and the second resonator 18, recombines the received light and outputs 22 light of mixed polarization (e.g. TE/TM). The output 22 of the second PDG thus forms a first output of the optical circuit 1.

The third PDG 30 is coupled to the drop port 26b of the third resonator 26 and the drop port 28b of the fourth resonator 28. The third PDG thus receives light of the same (e.g. TE) polarization from the third resonator 26 and the fourth resonator 28 and outputs 32 light of mixed polarization (e.g. TE/TM). The output 32 of the third PDG 30 thus forms a second output of the optical circuit 1.

The first and second outputs 22 and 32 may, for example, be into an optical fiber, into free space or into a transparent layer above or below a plane of the optical circuit. The first and second outputs 22 and 32 may be out of the plane of the optical circuit in a direction at an angle to the plane of the optical circuit.

It will be appreciated from the above that the resonators are arranged in pairs. Each resonator pair includes a resonator coupled to the first waveguide 12 and a resonator coupled to the second waveguide 14, with both resonators coupled to the same PDG. For example, first resonator 16 and second resonator 18 form a first resonator pair coupled to the second PDG 20, while third resonator 26 and fourth resonator 28 form a second resonator pair coupled to the third PDG 30.

It also follows from the above that the downstream PDGs act in reverse fashion to the upstream PDG. That is the downstream PDGs re-combine light which is coupled from the first and second waveguides and output mixed polarization light including both the first polarization and the second polarization. For example, the second PDG 20 re-combines light coupled from the first waveguide 12 by the first resonator 16 with light coupled from the second waveguide 14 by the second resonator 18. The light received by the second PDG 20 from the first resonator 16 has the first polarization (e.g. TE) and corresponds to light of the first polarization in the mixed polarization light signal 5 input to the optical circuit. This light is coupled by the second PDG into the output signal 22 in manner which conserves the first polarization. The light received by the second PDG 20 from the second resonator 18 also has the first polarization (e.g. TE), but corresponds to light of the second polarization (e.g. TM) in the mixed polarization light signal 5 input to the optical circuit. This light is coupled by the second PDG to the output signal 22 in such a way that it is converted back to the second polarization (e.g. TM).

Thus the second PDG 20 outputs an optical signal 22 including mixed polarizations (e.g. TE and TM) which corresponds to the input optical signal 5 of mixed polarizations (e.g. TE and TM). The third PDG operates in the same fashion to the second PDG described above, except that it receives light coupled by the third resonator 26 and fourth resonator 28.

While the optical circuit 1 has been described above as having two outputs 22 and 32, corresponding to the two downstream PDGs 20, 30, it will be appreciated that in other examples the optical circuit may have a greater number of downstream PDGs each forming a respective output of the optical circuit. Each downstream PDG may be coupled to a resonator pair as described above. This is illustrated by the dashed lined in FIG. 1 indicating that there may be further ring resonator pairs and downstream PDGs.

The resonators of each resonator pair may be tuned to a same resonant wavelength, so that a PDG coupled to the resonator pair recombines light of said resonant wavelength from the first and second waveguides into an output signal.

By controlling the tuning of the resonators, the optical circuit described above may be used as a de-multiplexer to split wavelengths, a power splitter to broadcast light, or an optical switch to switch input light to a single output or narrowcast input light to a plurality of outputs, as will now be described with reference to FIGS. 3A to 3D.

FIG. 3A shows a schematic example of an optical circuit which is configured to act as a de-multiplexer. The circuit has the same configuration as the optical circuit of FIG. 1, but for simplicity just the polarization diversity gratings (PDGs) and resonators are shown, while the first and second waveguides are not shown. The first PDG 10 acts as the input, the second PDG 20 acts as a first output, the third PDG 30 acts as a second output and the (N+1)th PDG 40 acts as an Nth output.

The mixed polarization light 5 input to the first PDG 10 may include a plurality of wavelengths. For example the light signal 5 may be a multiplexed signal with each wavelength conveying different information and corresponding to a different channel.

Each of the downstream PDGs 20, 30 and 40 is coupled to a respective resonator pair. Each resonator pair has a different resonant wavelength and couples light of the resonant wavelength to the associated downstream PDG. Thus, for example, the first resonator 16 and second resonator 18 may have a first resonant wavelength, while the third resonator 28 and fourth resonator 28 may have a second resonant wavelength which is different to the first resonant wavelength. The Nth resonant pair of resonators 46, 48 may have an Nth resonant wavelength which is different to the other resonant wavelengths.

Light of the first resonant wavelength is coupled to the second PDG by the first and second resonators 16, 18, re-combined and output as light of mixed polarizations of the first resonant wavelength at the first output 22 as shown by the solid arrow. Light of the second resonant wavelength is coupled to the third PDG by the third and fourth resonators 26, 28, re-combined and output as mixed polarization light of the second resonant wavelength at the second output 32 as shown by the dashed arrow. Light of the Nth resonant wavelength is coupled to the (N+1)th PDG 40 by the resonators 46, 48, re-combined and output as mixed polarization light of the Nth resonant wavelength at the Nth output 42 as shown by the dotted arrow. The light output from each of the outputs may mimic light of the same wavelength at the input. In this context, mimic means the light at the output has substantially the same amplitude as the light of the same wavelength at the input (disregarding minor optical losses). That is, for example, substantially all of the light of the resonant wavelength at the input is output via the PDG associated with the resonator pair having said resonant wavelength. Further, as the input light is of mixed polarizations and the output light is of mixed polarizations, the light at each output may have substantially the same amplitude for each polarization as the light of the same wavelength at the input.

FIG. 3B shows a schematic example of an optical circuit which is configured as an optical power splitter to broadcast a mixed polarization input light signal. The circuit may be similar to the circuit of FIG. 3A, except that each of the resonators may have the same resonant wavelength. Thus first resonator pair 16, 18 may have the same resonant wavelength as the other resonator pairs including second resonator pair 26, 28 and Nth resonator pair 46, 48. As a result of this, light of the same resonant wavelength is coupled to each of the downstream PDGs 20, 30, 40 and each downstream PDG outputs a respective mixed polarization light signal 22, 32, 42 which corresponds to the input mixed polarization signal 5. That is the optical circuit broadcasts the input signal 5 through each of the outputs.

Each of the downstream PDGs of the optical power splitter outputs light of the same wavelength, which is the resonant wavelength of the resonators. In some examples, each of the resonators may have a same plurality of resonant wavelengths, in which case each PDG may output the same plurality of resonant wavelengths. The input light signal 5 may be confined to the resonant wavelengths. However, if the input light signal includes non-resonant wavelengths, then these non-resonant wavelengths bypass resonators so that just the resonant wavelength or wavelengths are broadcast.

As well as each resonator being tuned to the same resonant wavelength or same set of resonant wavelengths, the optical circuit may be designed to have coupling coefficients for each of the resonators such that the output power is substantially the same for each downstream PDG. The coupling coefficient of a resonator is a parameter which measures the strength of coupling between a resonator and a waveguide. The coupling coefficient may depend upon the distance between the waveguide and the resonator, the coupling length (e.g. the length of the part of the waveguide which is close to the resonator), the refractive index of the waveguide, the refractive index of the resonator and the refractive index of material between the resonator and the waveguide. At critical coupling all of the light of resonant wavelength in the waveguide is coupled to the resonator or vice versa. Thus at critical coupling of the first resonator, all of the light of resonant wavelength in the first waveguide is coupled at the in port 16a into the first resonator 16 and coupled out of the first resonator, via the drop port 16b, on to the second PDG 20. Likewise for the second resonator at critical coupling. The coupling coefficient at critical coupling is known as the critical coupling coefficient.

In one example, the first and second resonators may have a coupling coefficient different from the critical coupling coefficient such that a portion of, but not all, of the resonant wavelength light in the first and second waveguides is coupled into the first and second resonators and remaining resonant wavelength light travels down the first and second waveguides towards the other resonator pairs.

In order that the strength of signals output from each of the downstream PDGs is approximately the same, the strength of coupling may increase for each successive resonator pair. For instance, the coupling coefficient of the first and second resonators may be less than a coupling coefficient of the third and fourth resonators and selected such that an output power from the second PDG and an output power from the third PDG is substantially the same. The strength of coupling may increase up to 100 percent for the last (e.g. Nth) resonator pair.

FIG. 3C shows a schematic example of an optical circuit which is configured as a 1×N optical space switch. A 1×N optical space switch is a device that is to selectively switch an optical signal from one input to at least one selected output from among N possible outputs. Selectively switch means that the switch may select which of the N outputs the optical signal is output through.

The circuit has the same configuration as the circuit of FIG. 1, but for simplicity just the polarization diversity gratings (PDGs) are shown. The example shows first to (N+1)th PDGs, 10, 20, 30 and 40. The first PDG 10 acts as the input, while each of the second to (N+1)th PDGs corresponds to a respective output.

An optical signal 5 of mixed polarizations is input to the first PDG 10. The optical space switch may output an optical signal of mixed polarization, corresponding to the input optical signal 5, from any selected one of the second to (N+1)th PDGs. By increasing or decreasing the number of downstream PDGs and associated resonator pairs, a 1×N switch of any size could be constructed.

In the illustrated example, the output signal 32 is from the third PDG. Thus, the input signal is switched to the output of the third PDG. However, another one of the downstream PDGs could be selected as the output of the space switch. Which PDG outputs light is determined by the tuning of the ring resonator pairs. For instance if each of the other resonator pairs is tuned to have a resonant wavelength different from the wavelength of the incoming light signal 5, while the resonator pair coupled to the third PDG is tuned to have a resonant wavelength which matches a wavelength of the incoming light then the light will be switched by the third PDG 30 to the second output 32 of the optical circuit.

As in the optical space switch described above, light is output from a selected one of the outputs. The light output from the selected outputs may thus mimic light of the same wavelength at the input. In this context, mimic means that the light at the output has substantially the same amplitude as the light of the same wavelength at the input (disregarding minor optical losses). That is, substantially all of the input light of a particular wavelength is output through the selected output. Further, as the input light is of mixed polarizations and the output light is of mixed polarizations, the light output from the selected output may have substantially the same amplitude for each polarization as the light of the same wavelength at the input.

Figure 2:
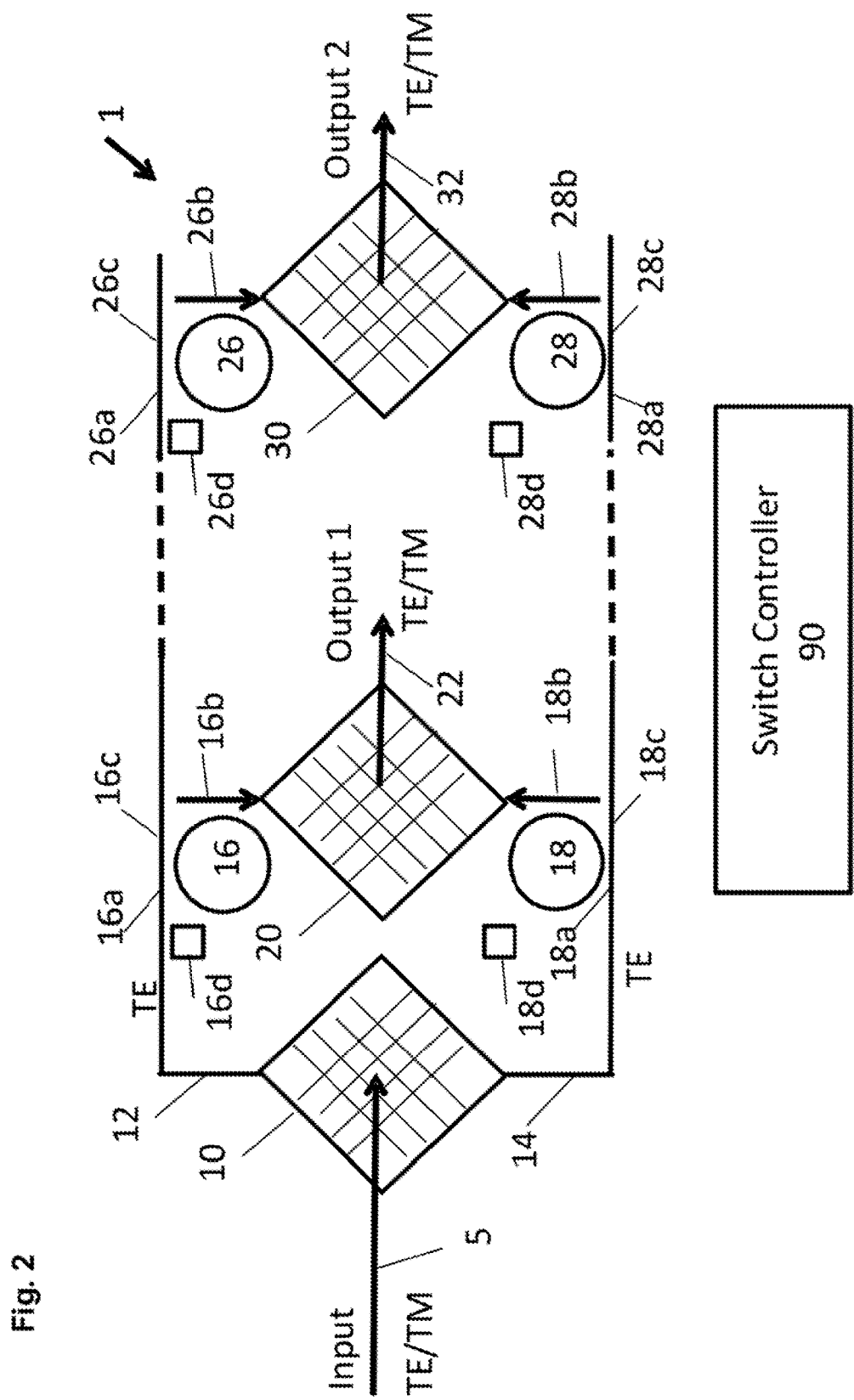
FIG. 2 is a schematic view of an example optical circuit according to the present disclosure.

As shown in FIG. 2, the optical circuit may comprise a plurality of resonator controllers, each resonator controller to control a resonant wavelength of a respective one of the plurality of resonators. E.g. there may be a first resonator controller 16*d* to control a resonant wavelength of the first resonator, a second resonator controller 18*d* to control a resonant wavelength of the second resonator, a third resonator controller 26*d* to control a resonant wavelength of the third resonator 26, a fourth resonator controller to controller a resonant wavelength of the fourth resonator 28 etc.

Each resonator controller may tune a resonant wavelength (and thus wavelength) of the associated resonator to a desired value. The resonant wavelength may be modified by heating the resonator, applying an electric or magnetic field to the resonator, injecting charge carriers to the resonator or otherwise. In this way the resonant wavelength may be changed by adjusting the length of the resonator cavity or adjusting the refractive index of the resonator. For example the resonator controller may comprise a heater, electro-optic polymer, ferroelectric material, MEMS etc.

Also as shown in FIG. 2, there may be a switch controller 90 to control the resonator controllers. For example the switch controller may include electronic logic circuitry to control each of the resonator controllers and set the resonant wavelength of each resonator to a desired value. In one example the switch controller 90 may comprise electronic logic circuitry to cause the optical circuit to selectively switch light received at the first PDG 10 to one, but not both of, the first and second outputs by controlling the resonant wavelengths of the first, second, third and fourth resonators. For instance, the switch controller may tune the first and second resonators to adopt a resonant wavelength which is the same as a wavelength of the input light and the third and fourth resonators to have a different resonant wavelength. In this case the light will be switched to the first output 22 via the second PDG 20 which is coupled to the first and second resonators 16, 18.

FIG. 3D shows an example of optical circuitry which is a 1×N space switch similar to FIG. 3C, but in which the optical space switch is used to narrowcast light. Narrowcast means to switch the input light to a number of outputs which is greater than one, but less than a total number of available outputs. In the illustrated example, the light of mixed polarizations is output at second output 32 by PDG 30 and at Nth output 42 by PDG 40, but is not output by PDG 20 to the first output. Thus, in this example, the light is output by two out of N outputs.

In this example the first and second resonators 16, 18 may be tuned to a resonant wavelength other than a wavelength of the input light. The light is thus not coupled to the first and second resonators and the second PDG 20. The third and fourth resonators 26, 28 may be tuned to have a first resonant wavelength equal to a wavelength of the input light 5 and a coupling coefficient different from the critical coupling coefficient such that a portion of, but not all, light having the first resonant wavelength in the first and second waveguides is coupled into the third and fourth resonators 26, 28. The portion of light of the first resonant wavelength which is not coupled into the third and fourth resonators, travels via the through ports of the third and fourth resonators down the first and second waveguides. The last resonators which are tuned to the resonant wavelength, in this example the Nth resonator pair 46, 48, may have a coupling coefficient such that all the remaining light of the resonant wavelength is tapped into the (N+1)th PDG 40 and output at the Nth output 42. The coupling coefficients of the resonators may be fixed or adjustably controlled such that substantially equal power is output through all of the outputs which are to narrowcast the output signal.

The coupling coefficient of each resonators is determined by the field overlap between the resonator and the waveguide. Thus, the coupling coefficient may depend upon a refractive index of the waveguide which is coupled to the resonator, a refractive index of the resonator or a refractive index of material between the resonator and the waveguide. The coupling coefficient may thus be set by the design of the waveguide and the resonator and material in between and in some examples may be controlled by adjusting the refractive index may by heating or cooling, by applying an electrical field or by Microelectromechanical systems (MEMs) etc. Thus, in some examples, the apparatus may include a heater, a thermoelectric cooler, electrical terminals for applying a potential difference and/or MEMs to control the coupling coefficient of a resonator.

By varying the resonant wavelength of the resonators in a controlled manner, the resonator controllers and the switch controllers may be used to switch or narrowcast light as explained above with reference to FIGS. 3C and 3D. Resonator controllers and in some cases also a switch controller may be also be used in the de-multiplexer and/or power splitter of FIGS. 3A and 3B. While, in de-multiplexing and power splitting the resonant wavelength for each resonator pair is usually held constant at a fixed value, due to manufacturing tolerances and changes in operational temperature of the device, resonators may not have the desired resonant wavelength and therefore a resonator controller may be used to adjust the tuning of a resonator to the desired fixed value.

Figure 4:
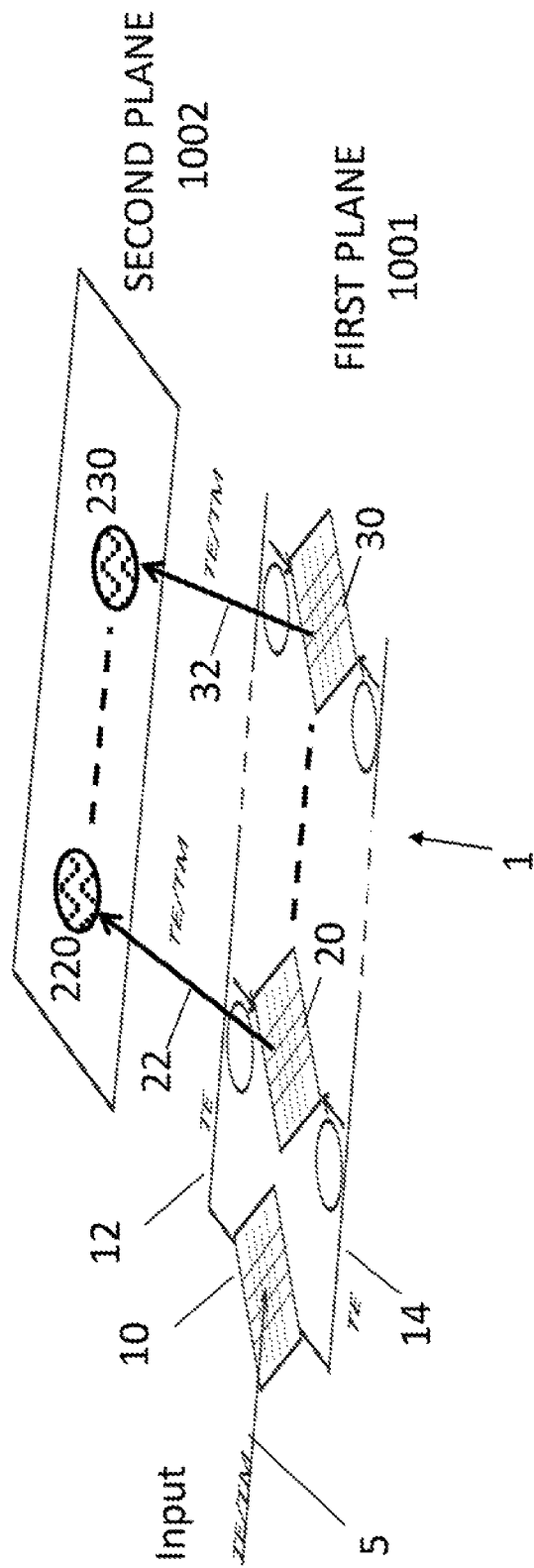
FIG. 4 is a schematic view of an example optical device in combination with a plurality of optical detectors according to the present disclosure.

FIG. 4 shows an example optical circuit 1 in combination with a plurality of optical detectors 220, 230. The optical circuit 1 may be similar to the optical circuit of FIG. 1 or FIG. 2 and like reference numerals indicate like parts. The components of the optical circuit, namely the upstream PDG 10, first waveguide 12, second waveguide 14, downstream PDGs 20, 30 and resonator pairs 16, 18, 26, 28 associated with the downstream PDGs may be disposed on a first plane 1001. Meanwhile, the plurality of optical detectors 220, 230 may be disposed on a second plane 1002 which is above or below the first plane.

For example, the first plane may be a first layer of a photonics integrated chip and the second plane may be a second layer of a photonics integrated chip. In another example, the first plane may be a first photonics integrated chip and the second plane may a second photonics integrated chip which is flip-bonded to the first photonics integrated chip, or otherwise secured in a position above or below the first photonics integrated chip.

While, in the illustrated example, there are two downstream PDGs each corresponding to a respective output of the optical circuit in the first plane 1, in other examples there may be further downstream PDGs and associated resonator pairs, as indicated by the dashed line in FIG. 4. Likewise, while FIG. 4 shows two optical detectors in the second plane, in other examples there may be more optical detectors as indicated by the dashed line in the second plane.

The optical detectors may for example be photodetectors. The photodetectors may be polarization diverse and may respond equally to light having the first polarization (e.g. TE) and light having the second polarization (e.g. TM). Each optical detector may be optically aligned with the output of a respective downstream PDG. For example, the first optical detector 220 may be aligned with the output 22 of the second PDG and the second optical detector 230 may be aligned with the output of the third PDG. In this way the respective optical detectors in the second plane are aligned with the respective outputs of the optical circuit in the first plane. Aligned means that the light output from the PDG is directed to and received by the optical detector which the PDG output is aligned with. In this way, the arrangement of FIG. 4 may provide a photonic apparatus that can switch, narrowcast, broadcast or de-multiplex an input optical signal and detect the output(s) in a polarization diverse manner, meaning that the apparatus can deal with light of a plurality of different optical polarizations.

The arrangement of FIG. 4 may be seen as a construction which in effect creates optical vias between a first plane 1001 and a second plane 1002, which is above or below the first plane. The space between the first plane and the second plane may be free space, or may be filled with a transparent material disposed between the first plane and the second plane. For example the first plane and the second plane may be bonded together by a transparent adhesive.

The optical circuit of FIGS. 1 and 2 may be used as a 1×N space switch. A plurality of optical circuits, such as those shown in FIGS. 1 and 2, may be arranged together to provide a N×N space switch, as will now be described with reference to FIGS. 5A, 5B, 5C, 6 and 7.

Figure 5A:
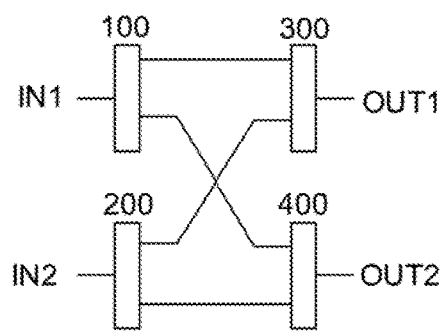
FIG. 5A is a schematic view of an example 2×2 switch according to the present disclosure.

FIG. 5A shows a schematic example of a plurality of polarization diversity switch elements (PDSEs) which are arranged to form a 2×2 polarization diversity switch according to the present disclosure. Each PDSE may correspond to a respective optical circuit. There are two input PDSEs 100 and 200, each of which has a single input and two outputs. There are two output PDSEs 300 and 400, each of which has two inputs and a single output.

The PDSEs may be arranged such that each respective output of an input PDSE is aligned with an input of a different output PDSE. In this way outputs of the first PDSE 100 and second PDSE 200 may be optically coupled to inputs of the third PDSE 300 and fourth PDSE 400.

In the illustrated example, the first PDSE 100 has an input 105, a first output 122 and a second output 132. The first output 122 of the first PDSE is aligned with, i.e. optically coupled to, a first input 305 of the third PDSE. The second output 132 of the first PDSE is aligned with, i.e. optically coupled to, a first input 405 of the fourth PDSE.

The second PDSE 200 has an input 205, a first output 222 and a second output 232. The first output 222 of the second PDSE is aligned with, i.e. optically coupled to, a second input 306 of the third PDSE. The second output 232 of the second PDSE is aligned with, i.e. optically coupled to, a second input 406 of the fourth PDSE.

The third PDSE 300 thus has a first input 305 aligned with, i.e. optically coupled with, the first output of the first PDSE 100 and a second input 306 aligned with the first output of the second PDSE 200. The fourth PDSE 400 thus has a first input 405 aligned with the second output of the first PDSE and a second input 405 aligned with the second output of the second PDSE.

The PDSEs are polarization diverse in that they are able to receive a light signal of mixed polarizations at their input(s) and output a corresponding light signal of mixed polarizations at their output, or a selected one of their outputs based on the input signal.

The first PDSE 100 is to receive a first mixed polarization light signal 105 and output the first mixed polarization light signal to a selected one of a first output 122 of the first PDSE and a second output 132 of the first PDSE.

The second PDSE 200 is to receive a second mixed polarization light signal 205 and output the second mixed polarization light signal to a selected one of a first output 222 of the second PDSE and a second output 232 of the second PDSE.

The third PDSE 300 is to output from output 332 mixed polarization light signals received at the first input 305 that is optically coupled to the first output of the first PDSE or at the second input 306 that is optically coupled to the first output of the second PDSE.

The fourth PDSE 400 is to output from output 432 mixed polarization light signals received at the first input 405 that is optically coupled to the second output of the first PDSE or at the second input 406 that is optically coupled to the second output of the second PDSE.

The first PDSE 100 and second PDSE 200 may be 1×2 polarization diverse optical switches as they are able to switch mixed polarization light from one input to a selected one of two outputs. Meanwhile the third and fourth PDSEs may be 2×1 switches as they are able to select one of two inputs from which to switch mixed polarization light to an output. The structure shown in FIG. 5A may thus combine a plurality of 1×2 switches to form a 2×2 switch. The input 105 of the first PDSE forms the first input IN1 of the 2×2 switch, the input 205 of the second PDSE forms the second input IN2 of the 2×2 switch, the output 332 of the third PDSE 300 forms the first output OUT1 of the 2×2 switch and the output 432 of the fourth PDSE forms the second output of the 2×2 switch.

The structure may be referred to as a tree structure as the respective outputs of each of the PDSEs 100, 200 is coupled to an input of a different PDSE 300, 400. While FIG. 5A shows a 2×2 switch, tree structures combining a plurality of 1×2 switches may be built to form any N×N switch. Further, while the PDSEs in FIG. 5A are 1×2 switches, in other examples the PDSEs could be 1×N switches.

Each of the PDSEs may comprise a plurality of PDGs optically coupled to a first waveguide and a second waveguide, with the PDGs acting as inputs and outputs, in order to provide polarization diverse switching.

In one example, each of the first PDSE 100 and second PDSE 200 comprises an upstream polarization diversity grating (PDG) to split mixed polarization light between a first wave guide and a second waveguide and optical circuitry to couple light from the first and second waveguide to a selected one of a plurality of downstream PDGs that are to recombine light from the first and second waveguides and output the recombined light as a mixed polarization light signal corresponding to a light signal received at the upstream PDG.

Figure 5B:
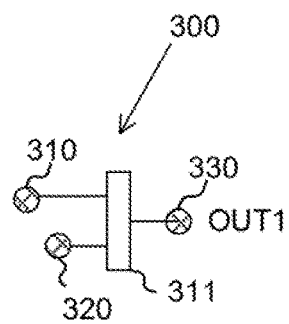
FIG. 5B is a schematic view of an example switch output element according to the present disclosure.

FIG. 5B shows an example structure for the third PDSE 300. The third PDSE 300 may include a first PDG 310 to act as a first input to receive a first mixed polarization light signal 305, a second PDG 320 to act as a second input to receive a second mixed polarization light signal 306 and a third PDG 330 which is to output 332 light of mixed polarization based on a selected one of the first or second light signals 305, 306. The first PDG 310 and second PDG 320 may be coupled to the third PDG by a planar waveguide arrangement 311. The fourth PDSE 400 may have a similar structure.

Figure 5C:
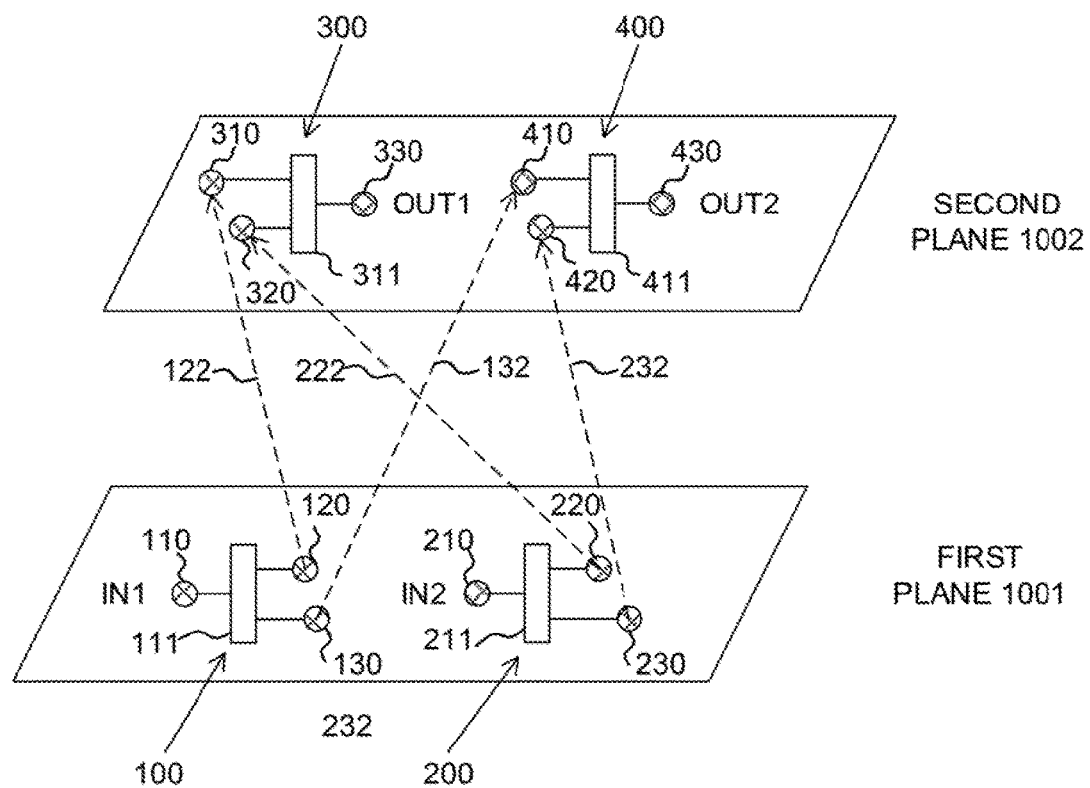
FIG. 5C is a schematic view of an example 2×2 switch comprising switch elements split between two planes.

The N×N switch formed by the PDSEs may include optical components on a plurality of planes. FIG. 5C shows a schematic example of a 2×2 switch in which the first PDSE 100 and second PDSE 200 are located on a first plane 1001, while the third PDSE 300 and fourth PDSE 400 are located on a second plane 1002 which is above the first plane. In other examples the second plane 1002 could be below the first plane. Light from the outputs of the first PDSE and second PDSE travels through the space between the first plane 1001 and the second plane 1002 to the inputs of the third PDSE and the fourth PDSE. The space between the planes may be free space, or there may be a transparent layer between the first plane 1001 and the second plane 1002.

As shown in FIG. 5C the first PDSE 100 includes a first PDG 110 which is to receive a mixed polarization input signal and a second PDG 120 and a third PDG 130 which are coupled to the first PDG by a planar waveguide structure 111. A light beam or optical fiber may be coupled to the first PDG 110 which acts as the first input IN1 of the 2×2 switch. The second PDSE 200 includes a first PDG 210 which is to receive a mixed polarization input signal and a second PDG 220 and a third PDG 230 which are coupled to the first PDG 210 by a planar waveguide structure 211. A light beam or optical fiber may be coupled to the first PDG 210 which acts as the second input IN2 of the 2×2 switch.

The first PDSE 100 and second PDSE 200 thus act as input elements of the switch. The third PDSE 300 and fourth PDSE 4000 meanwhile act as output elements of the switch. The third PDSE has a similar structure to that shown in FIG. 5B and includes a first PDG 410 and second PDG 420 optically coupled by a planar waveguide structure 411 to a third PDG 330 which acts as a first output OUT1 of the 2×2 switch. The fourth PDSE 400 has a similar structure including first and second PDGS 410, 420 optically coupled via a planar waveguide structure to a third PDG 430 which acts as a second output OUT2 of the 2×2 switch.

In still other examples, the third and fourth PDSEs 300, 400 could be located on the same plane 1001 as the first and second PDSEs 100, 200. In that case, the second plane 1002 could include mirrors, gratings or other reflectors to reflect the light signals 122, 132, 222, 232 output from the first and second PDSE to the respective inputs PDGs 310, 410, 320 and 420 of the third and fourth PDSEs on the first plane 1001.

Figure 6:
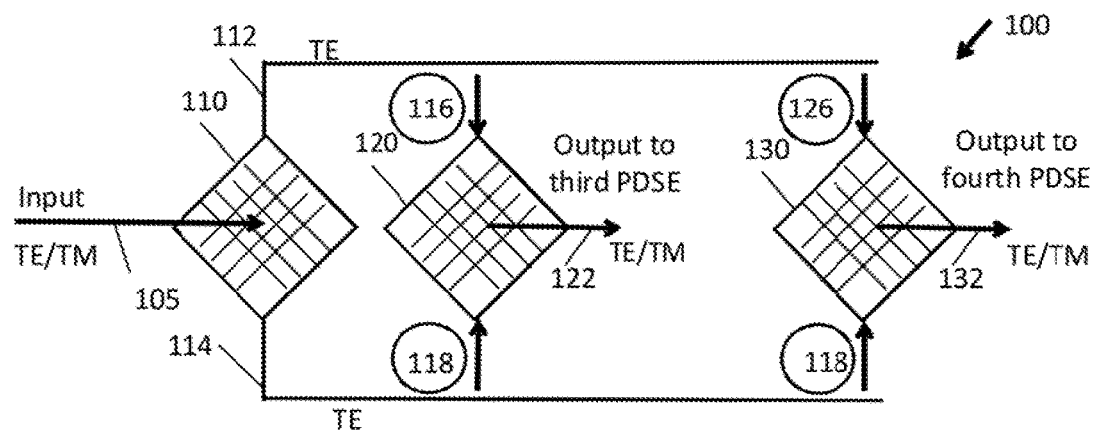
FIG. 6 is a schematic view of an example of an input element of a polarization diversity switch according to the present disclosure.

FIG. 6 shows a schematic example of the first PDSE 100 for use in a N×N switch, such as that shown in FIGS. 5A and 5C. The structure is similar to the optical circuit of FIGS. 1 and 2 and includes an optical device 110 to split an input mixed polarization (e.g. TE/TM) light signal 5 between a first waveguide 112 and a second waveguide 114 such that light of a first polarization (e.g. TE) is coupled to the first waveguide 112 and light of the second polarization (e.g. TM) is converted to the first polarization (e.g. TE) and coupled to the second waveguide. A plurality of resonator pairs 116, 118 and 126, 128 are coupled to the first and second waveguides, each resonator pair to couple light of a resonant wavelength from the first and second waveguides to a respective polarization re-combiner 120, 130. Each polarization re-combiner 120, 130 is to recombine light coupled from the first and second waveguides 112, 114 and output a mixed polarization light signal corresponding to the input mixed polarization light signal.

By controlling the resonant wavelengths of the first resonator pair 116, 118 and the second resonator pair 126, 128, the input mixed polarization light signal 5 may be switched to a selected one of the polarization re-combiners 120, 130. For example, if the first resonator pair 116, 118 is controlled to have a resonant wavelength the same as the input light signal 5, while the second resonator pair 126, 128 is controlled to have a resonant wavelength which is different from the input light signal 5, then the input light signal will be output via the first resonator pair 116, 118 to the first polarization re-combiner 120 and output 122. On the other-hand, if the first resonator pair 126, 128 is controlled to have a different resonant wavelength than the wavelength of the input light signal 5, while the second resonator pair 126, 128 is controlled to have a same resonant wavelength as the input light signal 5, then the input light signal will be output via the second resonator pair 126, 128 to the second polarization re-combiner 130 and output 132.

In FIG. 6, the optical device 110 is a polarization diversity grating (PDG). In other implementations of a PDSE in a N×N switch, the optical device 110 may include two separate devices: (i) a separate polarization splitter to direct light of the first polarization to the first waveguide and light of the second polarization to the second waveguide and (ii) a polarization rotator to convert light on the second waveguide to the first polarization. Likewise, while in FIG. 6 the polarization re-combiners 120, 130 are PDGs, in other examples the polarization combiners could include a separate polarization combining device and a polarization rotator. However, having separate polarization splitters/combiners and polarization rotators may take up more space, may increase the manufacturing complexity and may introduce further coupling losses to the optical circuit.

Figure 7:
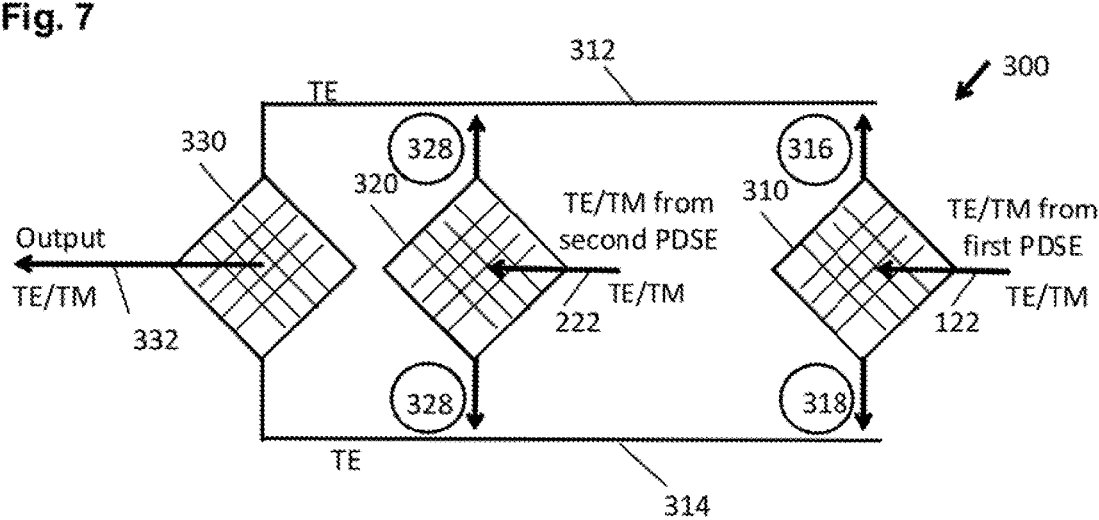
FIG. 7 is a schematic view of an example of an output element of a polarization diversity switch according to the present disclosure.

FIG. 7 shows a schematic view of an example implementation of the third PDSE 300 in FIGS. 5A to 5C. It will be appreciated that the structure of the third PDSE 300 is the same as the first PDSE shown in FIG. 6, but with light travelling in the opposite direction. So compared to FIG. 6, the outputs become inputs and the input becomes an output. The specific configuration of FIG. 7 makes use of reciprocal optics if identical or near identical 1×2 switches are to be used in both FIGS. 6 and 7.

Thus, the third PDSE 300 includes a first PDG 310 to receive a mixed polarization light signal 122 from the first output of the first PDSE and a second PDG 320 to receive a mixed polarization light signal 222 from the first output of the second PDSE. Each of the first and second PDGs 310, 320 is associated with a respective resonator pair 316, 318 and 326, 328. The resonant wavelengths of each of the resonator pairs may be controlled to selectively couple one of the input signals 122, 222 to the output 332.

For example, if the first resonator pair 316, 318 is controlled to have a resonant wavelength which is the same as a wavelength of the input mixed polarization signal 122, then first PDG 310 will couple a first polarization component (e.g. TE) of the mixed polarization light signal via resonator 316 to the first waveguide 312. Meanwhile, the first PDG 310 will couple a second polarization component (e.g. TM) of the mixed polarization light signal via resonator 318 to the second waveguide 314, in such a way that it is converted to the first polarization (e.g. TE). However, if the first resonator pair 316, 318 is controlled to have a different resonant wavelength than the input light signal 122, then the input light signal will not be coupled to the first and second waveguides 312, 314. Likewise for the second resonator pair 326, 328 which may couple an input mixed polarization signal 222 received at the second PDG 320 onto the first and second waveguides 312, 314.

The first waveguide 312 and second waveguide 314 together form the waveguide structure 311 referred to in FIG. 5B and are optically coupled to respective inputs of a third PDG 330 which is to recombine the light signals on the first waveguide and the second waveguide and output a mixed polarization light signal which corresponds to the input light signal 122 or 222 received at the first or second PDG. The fourth PDSE 400 may have the same structure as the third PDSE 300. As shown in FIG. 5C, the fourth PDSE 400 is to receive optical signals 132, 232 from the second outputs 130, 230 of the first and second PDSEs 100, 200.

In other examples the PDGs of the third and fourth PDSE may be replaced with optical splitters or combiners in series with a polarization rotator at one output thereof. However, compared to a separate optical splitter/combiner and rotators, a PDG may save space and cost, reduce manufacturing complexity and/or reduce coupling losses.

While in the example above, the first and second PDSEs 100, 200 have been described as input elements and the third and fourth PDSEs 300, 400 have been described as output elements, it is to be understood that by virtue of the reciprocity of optical circuits their roles could be reversed, i.e. the PDSEs 300, 400 may receive input signals which may be selectively switched to outputs of the PDSEs 100, 200. All of the features of the various example apparatus disclosed in this specification (including any accompanying claims, abstract and drawings), and/or all of the blocks of any method or process so disclosed, may be combined in any combination, except combinations where at least some of such features and/or blocks are mutually exclusive.

Furthermore, except where explicitly stated otherwise or where the context or logic demands otherwise, the processes described herein may be carried out in any order and are not limited to the specific order shown in the particular examples. Some the processes or method blocks described herein may be carried contemporaneously with each other.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

What is claimed is:

1. An optical circuit comprising:
    a first polarization diversity grating (PDG) to receive input light of two mixed polarizations and output light to a first waveguide and a second waveguide, wherein the light output to the first waveguide has a same polarization as the output light to the second waveguide;
    a plurality of resonators, each resonator having at least one resonant wavelength and including an in port through which to receive light, a drop port through which to direct light of the at least one resonant wavelength and a through port through which to direct light which is not of a resonant wavelength;
    the first waveguide being optically coupled to a first resonator and a third resonator of said plurality of resonators, wherein the through port of the first resonator is optically coupled via the first waveguide to the in port of the third resonator;
    the second waveguide being optically coupled to a second resonator and a fourth resonator of said plurality of resonators, wherein the through port of the second resonator is optically coupled via the second waveguide to the in port of the fourth resonator;
    a second polarization diversity grating (PDG) coupled to the drop ports of the first resonator and the second resonator to receive light of the same polarization from the first resonator and the second resonator and output light of mixed polarizations at a first output; and
    a third polarization diversity grating (PDG) coupled to the third resonator and the fourth resonator to receive light of the same polarization from the third resonator and the fourth resonator and output light of mixed polarizations at a second output.

2. The optical circuit of claim 1 wherein the resonators are ring resonators.

3. The optical circuit of claim 1 wherein the first resonator and second resonator have a first resonant wavelength and the third resonator and fourth resonator have a second resonant wavelength which is different to the first resonant wavelength.

4. The optical circuit of claim 1 where the first, second, third and fourth resonators have the same resonant wavelength.

5. The optical circuit of claim 1 wherein the circuit is a broadcast device, each resonator is tuned to the same resonant wavelength, a coupling coefficient of the first and second resonators is less than a coupling coefficient of the third and fourth resonators and selected such that an output power from the second PDG and an output power from the third PDG is substantially the same.

6. The optical circuit of claim 1 comprising a plurality of resonator controllers, each resonator controller to control a resonant wavelength of a respective one of the plurality of resonators.

7. The optical circuit of claim 1 comprising a switch controller to cause the optical circuit to selectively switch light received at the first PDG to one, but not both of, the first output and the second output by controlling the resonant wavelengths of the first, second, third and fourth resonators.

8. The optical circuit of claim 1 wherein the first and second resonators have a first resonant wavelength and a coupling coefficient different from a critical coupling coefficient such that a portion of, but not all, light having the first resonant wavelength in the first waveguide and second waveguide is coupled into the first resonator and the second resonator.

9. The optical circuit of claim 1 in combination with a plurality of optical detectors, wherein the optical circuit is disposed on a first plane and the plurality of optical detectors are disposed on a second plane which is above or below the first plane; wherein a first optical detector of said plurality of optical detectors is optically aligned with the first output and a second optical detector of said plurality of optical detectors is optically aligned with the second output.

10. The optical circuit of claim 9 wherein a transparent material is disposed between the first plane and the second plane.

11. A plurality of optical circuits each in accordance with claim 1, wherein the optical circuits are combined in a tree structure to form a N×N optical switch.

12. The plurality of optical circuits of claim 1 wherein some of the optical circuits are on a first plane and some of the optical circuits are on a second plane which is above or below the first plane.

13. An optical space switch comprising:
   an upstream 2D grating to receive input light of mixed polarization and output light of a first polarization to a first waveguide and output light of the first polarization to a second waveguide;
   the first waveguide and the second waveguide being optically coupled to a plurality of resonator pairs such that any light not entering a first resonator pair travels down the first waveguide towards a next resonator pair, each resonator pair including a resonator coupled to the first waveguide and a resonator coupled to the second waveguide; and
   a plurality of downstream 2D gratings;
   wherein each downstream 2D grating is optically coupled to a respective resonator pair so as to receive light of the first polarization from both resonators of the respective resonator pair and output light of a mixed polarization corresponding to the input light of mixed polarization.

14. The optical space switch of claim 13 comprising a switch controller to cause the optical space switch to narrowcast by control of resonant wavelengths of the resonator pairs such that light of a first wavelength is output from at least two of the downstream 2D gratings and light is not output from at least another of the downstream 2D gratings.

15. The optical space switch of claim 13 comprising a switch controller to cause the optical space switch to switch light to a selected one of the downstream 2D gratings by control of resonant wavelengths of the resonator pairs such that light is output from the selected one of the downstream 2D gratings and light is not output from the other downstream 2D gratings.

16. An optical switch comprising:
   a first polarization diversity switch element (PDSE) to receive a first mixed polarization light signal and output the first mixed polarization light signal to a selected one of at least a first output of the first PDSE and a second output of the first PDSE;
   a second polarization diversity switch element (PDSE) to receive a second mixed polarization light signal and output the second mixed polarization light signal to a selected one of at least a first output of the second PDSE and a second output of the second PDSE;
   a third polarization diversity switch element (PDSE) that is to output mixed polarization light signals received at a first input that is optically coupled to the first output of the first PDSE or received at a second input that is optically coupled to the first output of the second PDSE;
   a fourth polarization diversity switch element (PDSE) that is to output mixed polarization light signals received at a first input that is optically coupled to the second output of the first PDSE or received at a second input that is optically coupled to the second output of the second PDSE,
   wherein the third PDSE includes a first polarization diversity grating (PDG) that acts as the first input, a second PDG that acts as the second input and a third PDG which is to output light of mixed polarization.

17. The optical switch of claim 16, wherein each of the first PDSE and the second PDSE comprises an optical circuit including:
   an upstream optical device to split the received mixed polarization light signal between a first wave guide and a second waveguide; and
   optical circuitry to couple light from the first waveguide and second waveguide to a selected one of a plurality of downstream optical devices that are to recombine light from the first waveguide and second waveguide and output the recombined light as a mixed polarization light signal.

18. The optical switch of claim 16 wherein the upstream optical device is a polarization diversity grating and the downstream optical devices are polarization diversity gratings.

19. The optical switch of claim 16 wherein the first PDSE and second PDSE are on a first plane and the third PDSE and fourth PDSE are on a second plane which is above or below the first plane.

* * * * *